United States Patent [19]
Hjortendal et al.

[11] 3,936,612

[45] Feb. 3, 1976

[54] CONTROL AND HOLDING CIRCUIT FOR RELAY MATRICES

[75] Inventors: Royne Gunnar Hjortendal, Sorunda; Jöns Kurt Alvar Olsson, Tullinge, both of Sweden

[73] Assignee: Telefonaktiebolaget L M Ericsson, Stockholm, Sweden

[22] Filed: June 5, 1974

[21] Appl. No.: 476,412

[30] Foreign Application Priority Data
June 27, 1973 Sweden.............................. 7309028

[52] U.S. Cl. ......................... 179/18 GE; 340/166 S
[51] Int. Cl.² ........................................... H04Q 1/52

[58] Field of Search ......... 179/18 GE, 18 GF, 18 E, 179/18 G, 18 H, 18 EA; 340/166, 166 S

*Primary Examiner*—Thomas A. Robinson
*Attorney, Agent, or Firm*—Hane, Baxley & Spiecens

[57] ABSTRACT

In a relay matrix there are provided a plurality of control and holding circuits for selecting which of the relays are to be energized. The control and holding circuits which are associated with groups of relays include two-state devices which are triggered into a conductive state at the coincidence of a control signal and a minimum value control current and remain in that state after the termination of the control signal until the control current falls below the minimum value.

11 Claims, 10 Drawing Figures

CONTROL AND HOLDING CIRCUIT FOR RELAY MATRICES

The present invention relates to a control and holding circuit for relay matrices especially for cascaded reed relay matrices in the switches of electronic controlled telephone stations.

Nowadays, in fast electronic controlled telephone switches, large and small reed relays arranged in switching matrices are often used instead of the conventional electromechanical switching devices.

A reed relay consists of a contact unit enclosed in a glass cylinder, which contact unit can be actuated from the outside of said glass cylinder by means of a magnetic field, and a magnetic coil for producing the magnetic field. Several glass cylinders are often placed in a common coil thereby constituting together with the coil a relay unit. In order to control such relay units current is passed through the coil so that all the contact units in the common magnetic field are actuated. In order to control with short pulses a switch designed by means of the above described relay matrices some type of holding contact is needed so that the activated relays can be supplied with a holding current. According to the common method, each relay unit in the matrix is supplied by an extra contact unit in addition to the contacts for the speech paths, which serves as a holding contact. Such a solution of the problem is shown in for instance the German Auslegeschrift No. 1 047 851.

It is necessary in relay matrices of the kind under discussion to connect a diode in series with each relay coil in order to get a matrix without so called reverse or sneak current paths. If such diodes were not used or if a matrix with such diodes is faulty in such a way that several diodes are shorted then uncontrolled operations of unintended crossing point relays would result by activation of an intended crossing point relay.

An object of the present invention is to provide an electronic control and holding circuit well suited for integrated techniques which replaces the diode and the extra reed relay contact according to the previously known approach.

The present invention provides a control and holding circuit common for a number of relay units in the matrix, for instance common for a row of units or a column of units in the matrix. In order to make the circuit suitable for this purpose it is provided with a number of relay connection terminals which constitute the connection points for a corresponding number of matrix relays. Further the circuit is provided with link output terminals which constitute the connection points for links by which control voltages are transferred between adjacent matrices in the cascade and also at least one control signal terminal for receiving control signals for the control and holding circuit.

The circuit is further provided with a number of bistable electronic switching devices each with a first and a second main electrode and a control input. The switching devices by means of their main electrodes are connected between the relay connection terminals and a common voltage supply terminal. Operation of a switching device according to the above is carried out when a voltage of a certain minimum amplitude and with a definite polarity is fed to the main electrodes simultaneously as a control signal is fed to its control input. Reset to the non-conducting state occurs when the current through the switching device falls below a certain value.

By centralizing control and holding functions for a number of relays within the same matrix according to the invention it is possible to realize these functions utilizing integrated techniques in an economically advantageous way. By the special design of the separate switching devices in the circuit according to the invention two components, a diode and a reed relay contact are saved per crossing point. The necessary diode function is integrated in the holding circuit.

The number of switching devices per control and holding circuit is limited by the maximum pin number for the package type and by the wish that every package should be associable with a certain part of the matrix which is easily identified, for instance a row or a column.

If for instance the control and holding function in an 8 × 8-matrix is combined for each column to a common integrated circuit one replaces, compared with the known technique, one reed relay contact and one diode in 64 crossing points, i.e. 128 components for eight packages. From a mechanical point of view, this is a great simplification.

Furthermore it is possible to design the bistable electronic switching or contact devices in the control and holding circuit in such a way that they, for instance, receive a lower holding current than the operating current of the reed relay devices. On this assumption one can set up a complete connection through the switch without activating corresponding reed relays, i.e. without establishing the speech path through the switch. This possibility is quite impossible when, according to conventional techniques, one has a holding contact in the form of an additional reed relay device in series with the relay coil wherein the relay device is actuated simultaneously with the speech path contacts. If, according to the above, a complete path through the switch is connected without the speech path contacts being operated, a voltage increase between the end points of the connection is sufficient in order to make all the speech contacts operate in the next connection phase.

Thus advantage can, for instance, be utilized by a marking procedure which provides random attempts of connection through the switching stages. For every such attempt from a given input the connection towards the given output is carried out as far as it is possible. If the connection along the random path appears to be impossible to carry through one clears the connection and makes another attempt according to the same method until a complete path is found. It is essential by this method which requires much more unsophisticated marking control circuits than the conventional marking methods that the speech path contacts are not operated by uncompleted connection attempts.

Of course it is advantageous to have just one type of reed relay device in a switch. Because of the fact that the holding contact device is the reed relay device which has the prime importance in the design according to the conventional technique the specifications for this element must determine the design of the reed relay devices for the switch. When the holding contact in the form of a reed relay device according to the invention is eliminated in the design one can consequently diminish certain demands upon the reed relay devices, among others the demand for current carrying feature, and gain economic profits.

The invention will be described below by means of a number of embodiments with reference to the accompanying drawing where FIG. 1 shows a two stage matrix switch.

Figure 1:
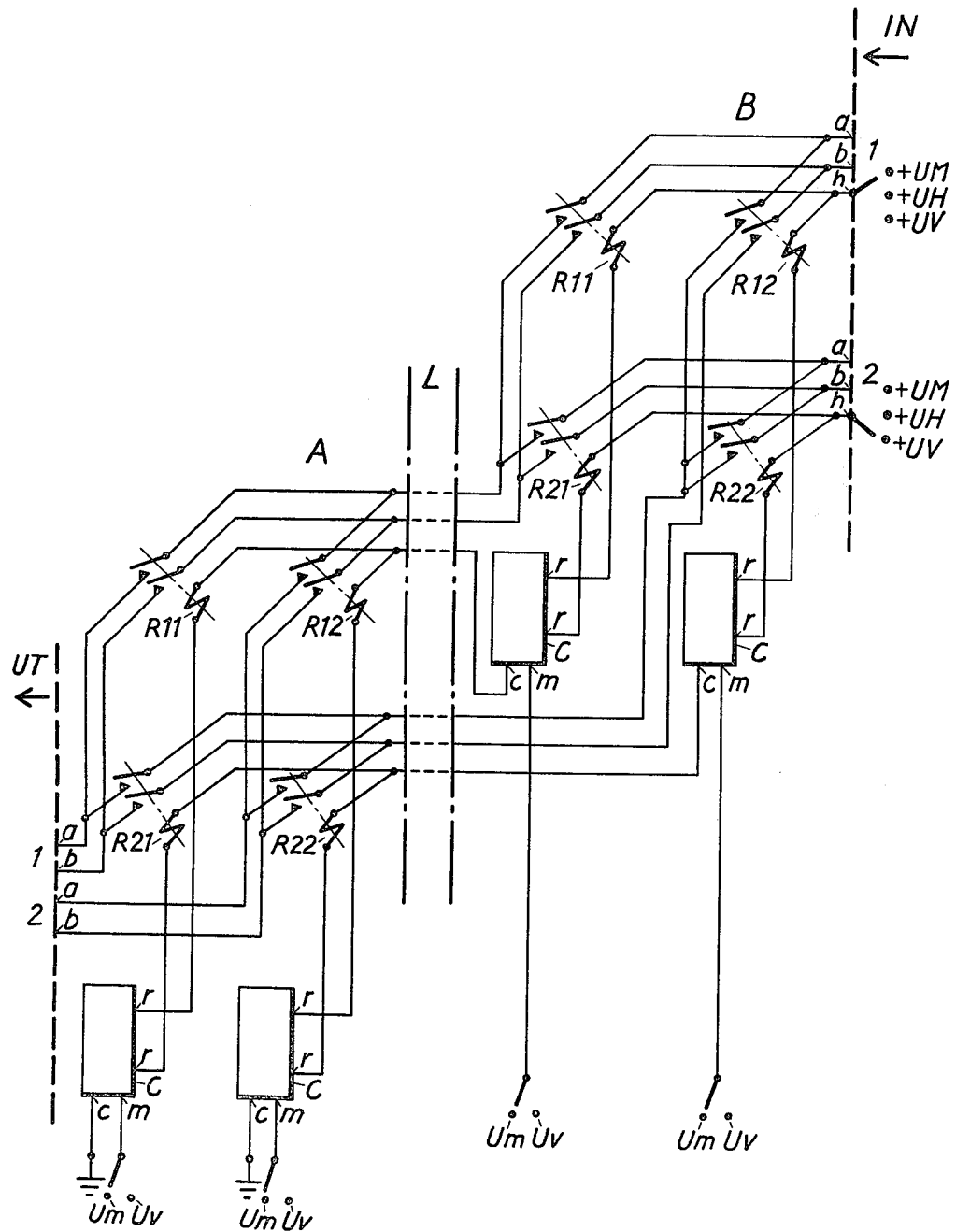

FIG. 1 shows a two stage matrix switch in which the two matrices are called A and B respectively. The matrices are connected to each other by links L. The rows of the matrix B are marked as inputs and the columns of matrix A are marked as outputs. For the sake of simplicity the matrices are shown in the order 2 × 2, but naturally they can have any other order. The speech wires are in the conventional way designated $a$ and $b$ respectively. The switch connects a given input with a given output when so ordered externally from, for instance, a processor. This means that the $a$ and $b$ wires respectively are caused to make contact from the input to the output. Each of the relays in the cross points of the matrices consists of a relay coil (R11 . . . . R22) and the associated two make contacts on the $a$ and $b$ wires respectively. For each column in the matrices in this embodiment a control and holding circuit C is arranged. According to the invention the control and holding circuits can alternatively be arranged common for a row or another part of the matrix.

One of the advantages with a switch designed according to the above compared with a switch comprising just one stage is that each input in the switch here described has, besides access to each output, also two alternative ways between an arbitrary input and a given output. If more switching stages are provided even more path finding alternatives are possible. Thus for the path finding alternatives of such a switch different strategies are applicable. As shown above the invention has a special advantage for a certain type of path finding strategy.

The setting up of a connection is assumed to start in stage B. Control voltage UM is connected by a contact or switch device to the holding wire h of the input row and the control and holding circuit C associated with a column corresponding to the intended crossing point relay is supplied with a marking voltage Um on a control signal terminal $m$. Then, as will be shown later, the crossing point relay selected in this way can be operated. The contact device for connection of the control voltage to the holding wire h is schematically shown as a switch with three different connection possibilities, but it can be designed with relays, electronic flip flops and so on. When a crossing point relay has been marked as described above the control voltage is transferred by the link output terminal c of the circuit C and the link L to a row in the following matrix, i.e. the matrix stage A. In the same way a certain crossing point relay in this row can be marked by providing a voltage to the control and holding circuit C of the corresponding column. The control and holding circuits of the output stage, in this case stage A, connect the link output terminals c to a voltage source, for instance ground, as shown.

When a connection is completed between an input and an output of the switch the voltage between the end points of the holding wire can be decreased because the voltage demand to hold a relay activated is less than the demand for giving a proper operation. Furthermore it is possible to increase or decrease the voltage at the end points of the connection simultaneously and by equal amounts thereby achieving interference immunity for the connection against additional connections through the matrices.

In order to clear a connection and reset the devices involved in the connection to rest position a rest voltage UV, for instance ground, is connected to the holding wire $h$ of the switch input and all the relays in the connection are disabled simultaneously.

Figure 2:
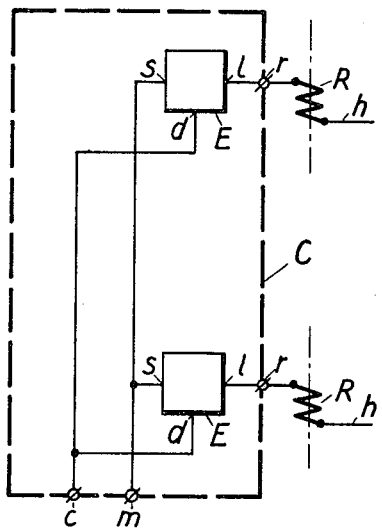
FIG. 2 shows a control and holding circuit according to one embodiment of the invention for holding the relays in series in a connection with a through connected holding wire.

FIG. 2 shows a control and holding circuit C according to FIG. 1 designed for holding the relays R in series in a connection with a through connected holding wire. Thus the relays R connected to the relay connection terminals r of the circuit are the same as the column relays of a matrix stage according to FIG. 1. The circuit C comprises two bistable electronic switch or contact devices E each provided with two main electrodes $l$ and $d$ and a control input $s$. The contact devices E can be the devices according to FIG. 8 or 9 but with the connection points e and n omitted. The control inputs $s$ are connected to a common control signal terminal $m$ on the circuit C and the main electrodes $d$ are in the same way connected to a common link output terminal $c$. In a step by step marking procedure similar to the one described above in connection with FIG. 1 there are two different possibilities for carrying out the marking routine dependent on the speed of the circuits. In a slow procedure the control voltage UM according to FIG. 1 which is fed to the holding wire h in a selected row in the matrix stage B will cause a current to flow through this holding wire, the coil of the selected relay by the relay connection terminal r of the circuit C, the main electrode 1 of the contact device E, the control input s and by the control terminal m to the marking voltage source Um. If there is no marking procedure started at once in the subsequent matrix stage the current through the relay coil and the contact device E will grow over the value of the operating current of the relay causing it to operate, provided the marking voltage source Um is not current limited. The contact device E has by that time also become conductive and transfers the operating voltage via the main electrode d to the link output terminal c of the circuit C. This state is steady as long as the marking voltage is connected to the control signal terminal m. By the link output terminal c and the link L according to FIG. 1 the control voltgage is thus transferred to a row of the matrix stage A. When a selected crossing point relay in this matrix stage has operated the rest voltage Uv can once again be fed to said control signal terminals m in both matrix stages and the holding current flows via the link output terminal c of the circuit C in the stage A to ground.

In a faster procedure or if the voltage source Um is current limited the current through the relay coil in the matrix stage B will not grow over the operating value before the marking voltage Um is fed to a selected column in the matrix stage A so that the operating current of the relays will not be fed via the control signal terminals m of the circuits C during any moment of the procedure, but will be fed directly via the link output terminal c of the circuit C in the stage A to ground.

Figure 3:
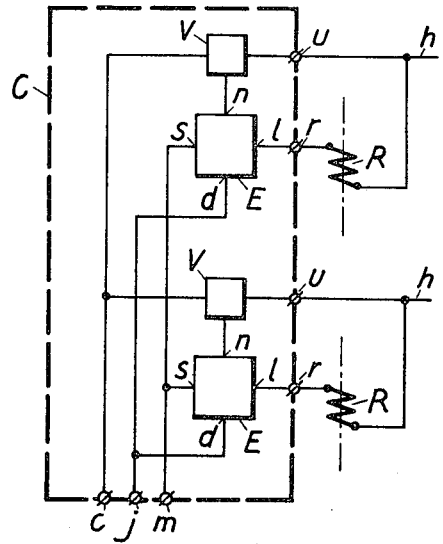
FIG. 3 shows a control and holding circuit according to another embodiment of the invention for holding the relays in parallel, and through connection of the control and holding voltages to the subsequent matrix stage by a through connection circuit which is individual for each contact device.

FIG. 3 shows another embodiment of the control and holding circuit C designed for holding in parallel the relays R in a connection and providing a through connection to the subsequent matrix stage of the control and holding voltages via a through connection circuit V associated with each contact device E. In order to be able to use low operating voltages it is essential to make the voltage drops along the holding wire h as small as possible especially when there are several matrix stages. The voltage drops occurs mainly across relays R when carrying current, but also across contact devices E connected in series with the relays. In the embodiment according to FIG. 3 the holding wires h are not only connected directly to an additional voltage feeding terminal u of the circuit C but also to the connection terminal of the relaysR. The through connection circuits V which can consist of one single transistor with an emitter connected to the voltage feeding terminal u, a collector connected to a common link output terminal c and a base connected via a resistor to the output n of the contact device E, connects the operating voltage with a smaller voltage drop to the common link output terminal c. At the output n a signal is provided for indicating the state of conductivity of the contact device E. As is evident from the FIG. 8 and 9 the output n may be connected to one of the common base collector connections in the contact device E, the function of which will be described more in detail below. The control inputs s are connected as in the embodiment according to FIG. 2. Further all the main electrodes d are connected to a voltage feeding terminal j of the circuit c which in its turn is connected to a fix potential, for instance ground. Accordingly all the relays in the connection will be connected in parallel between the holding wire h and ground. Thus in this embodiment the operating current of the relays will not, to a greater extent, during any instant of the marking procedure, flow via the control signal terminals m of the circuit C.

Figure 4:
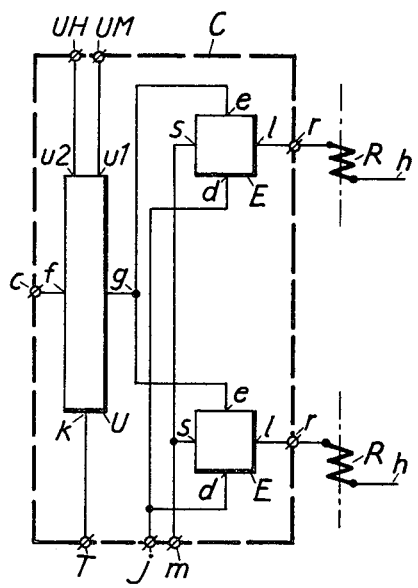
FIG. 4 shows a control and holding circuit according to another embodiment of the invention for holding the relays in parallel, and through connection of the control and holding voltages to the subsequent stage by means of a clock signal controlled through connection circuit which is common for the holding contact devices.
Figure 8:
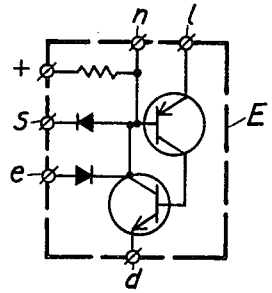
FIG. 8 shows a simple embodiment of a bistable electronic contact device utilized in the apparatus according to FIG. 2–7.
Figure 9:
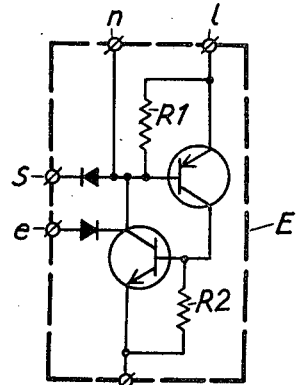
FIG. 9 shows the device according to FIG. 8 completed with two resistors for making the device adaptive to given function parameters.

In FIG. 4 there is shown an embodiment of the invention in which, in the same way as in the embodiment according to FIG. 3, the relays are provided with holding current in parallel between the voltage of the holding wire h and a fixed potential connected to the voltage feeding terminal j. The through connection circuit U is in this cases common for the contact devices and furthermore controlled by an external signal on a control signal terminal T. The external signal can, for instance, be supplied from a central clock signal generator common for all control and holding circuits in the switch. The main electrodes l and d of the contact devices E as well as the control inputs s are connected to the inputs and outputs of the circuit C in the same way as in the embodiment according to FIG. 3. Each of the contact devices E is provided with an output e which according to FIGS. 8 and 9 is connected, via a diode, to one of the common base-collector connections in the contact device. As will be shown below, the signal of this output may take two different levels, high and low, in dependence on whether the contact device is conducting current or not. All these outputs e are connected to a common detection input g of the common through connection circuit U. Control switch UM and holding voltage UH are connected to the through connection circuit U in each circuit C and are connected via the output f of the through connection circuits and the link output terminal c to the subsequent matrix stage almost without voltage drop which makes it possible to hold the voltages low. A marking procedure in a switch designed with control and holding circuits according to FIG. 4 is started when a clock signal is fed to and maintained at the control signal terminal T of all the circuits C. In the matrix stage B the holding wire h is provided with a voltage in a selected row in the same way as described above. When after that a column is selected by feeding marking voltage Um to the associated circuit C the contact device E at the coinciding point will be operated and the output e takes a level which corresponds to conducting state for the contact device. This signal level is transferred to the detection input g of the through connection circuit U and causes the connection of the operating voltage UM, via the output f, and the link output terminal c, to the matrix stage A. In this stage the clock signal is maintained according to the above at all the control signal terminals T and a procedure analogous with the described may be repeated for this matrix stage. When the voltage UM has been connected for such a long time that a proper operation has taken place in the matrix stage the clock signal is cleared at the control signal terminal T and the holding voltage UH is connected to the input in the matrix stage B. The clearance of the clock signal also causes the holding voltage UH, connected to the through connection circuit U in the matrix stage B, to be connected via the output f and the link output terminal c of the circuit C to the matrix stage A. The switching logic in the through connection circuit U thus in a steady state and is in the future not sensitive to changes in the level of the clock signal before the signal at the input g changes its level. When there is no voltage fed to the input in the matrix stage B anymore, the contact device in stage B is brought to the stop condition, and the associated output *e* and the input *g* change their levels. This makes the voltage to the through connection circuits U switching the circuit to its rest state and the whole connection is cleared.

Figure 5:
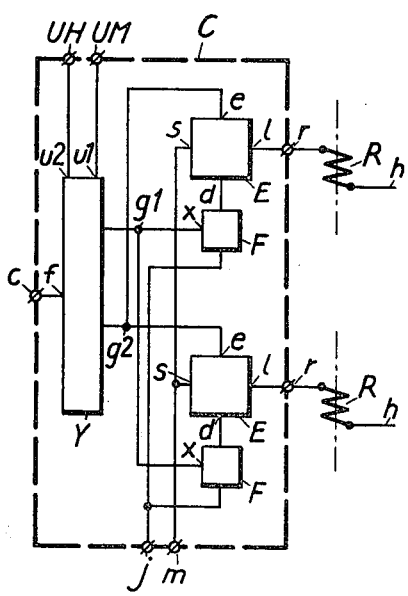
FIG. 5 shows a control and holding circuit according to another embodiment of the invention for holding the relays in parallel, and through connection of the control and holding voltages to the subsequent stage by means of a through connection circuit which is common for all the holding contact devices and controlled by two variables associated with the state of the holding contact devices.

In FIG. 5 a further embodiment of the invention is shown intended for holding the relays in parallel against a fixed potential. In this embodiment clock signal control is not utilized and the common through connection circuit Y is controlled by two state variables of the contact devices E. The control input s and the main electrode 1 of each contact device are connected as in the preceeding example. The main electrode *d* is connected to a common voltage feeding terminal *j* via current measuring circuit F which is provided with a detection output X. The detection output is connected to a detection input *g*1 on the through connection circuit Y which input is common for all such outputs. The outputs *e* on the contact devices are also connected to a common detection input *g*2 on the through connection circuit. The signal at the output *e* has, as mentioned above, two different levels related to respectively stop and pass condition of the contact device. The output X of the current measuring circuit F provides a signal which also has two different levels related to respectively control and holding current through the measuring circuit. The combination of the signals at the measuring inputs g1 and g2 consequently tells if a contact device E is conducting current and whether it is a control current or a holding current. The function of the through connection circuit Y, which will be described more in detail below, is such that if a contact device E is conducting control current, the control voltage UM which is connected to the through connection circuit will be connected, via the output *f* and the link output terminal *c*, to the next stage and if a contact device is conducting holding current, the connected holding voltage UH will be through connected, respectively.

Figure 6:
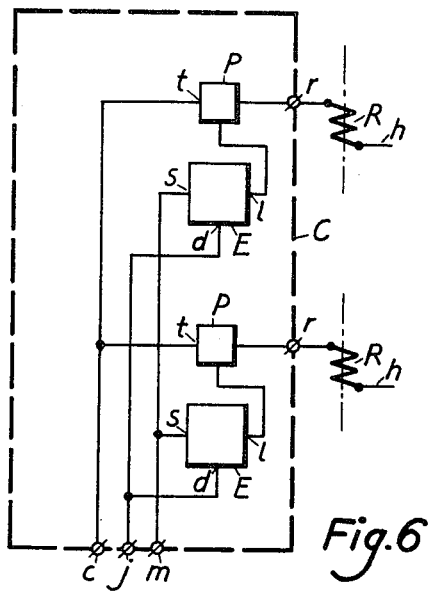
FIG. 6 shows a control and holding circuit according to another embodiment of the invention for holding the relays in parallel and through connection of control and holding voltages to the subsequent stage by means of a through connection circuit which is individual for each holding contact and which is connected in series with each relay.

FIG. 6 shows a control and holding circuit for holding the relays in parallel and a through connection to the subsequent matrix stage of control and holding voltages via a through connection circuit in series with each relay, there being a through connection circuit for each holding contact. The design of the contact devices E is the same as in the embodiment according to FIG. 2 and the connection of the control inputs *s* and the main electrodes *d* is accomplished in the same way as in the embodiment according to FIG. 3. The remaining main electrode *l* on each contact device is, via a through connection with P, connected to the associated relay connection terminal *r*. When a voltage is provided across the series connection comprising the relay R, the through connection unit P and the contact device E a current will flow. Consequently, the output *t* on the through connection unit transfers the voltage at the relay connection terminal *r* to the link output terminal *c*. A unit P having features according to the above may comprise in a very simple embodiment a transistor with its emitter connected to the relay connection terminal *r*, its collector connected to the output t and the base via a resistor connected to the main electrode *l*. The marking procedure for a matrix switch designed with control and holding circuits according to this embodiment may be the same as for the embodiment according to FIG. 2.

Figure 7:
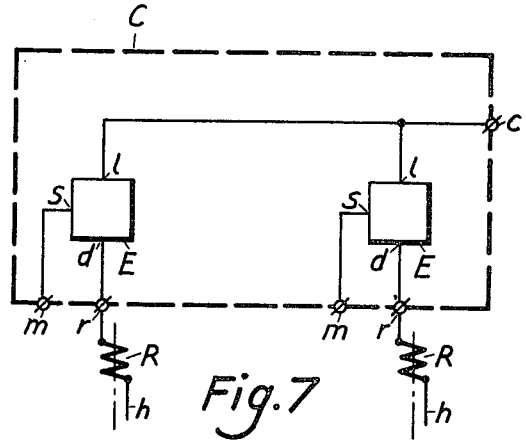
FIG. 7 shows a control and holding circuit according to another embodiment of the invention for centralizing the control and holding function for each row in a relay matrix.

FIG. 7 shows a simple embodiment of the invention designed for centralizing row by row of the control and holding function in a relay matrix. The example can be regarded as a conversion of the embodiment according to FIG. 2. The design of the contact devices E coincides in this example too with the design according to FIG. 2. Each of the control inputs s is connected to one of a number of control signal terminals m and the control and holding voltages respectively of the relays are fed to the circuit via the terminal *c*. The contact devices E are connected in parallel between the terminal c and the corresponding relay connection terminal *r*. The marking procedure is the same as the one described with reference to FIG. 2.

Each of the other embodiments described here above may naturally be converted from a design with control and holding functions integrated column by column to a design with an integration of the functions row by row.

FIG. 8 shows a simple embodiment of a bistable electronic switch or contact device utilized in the devices according to FIGS. 2–7. The contact device consists of a first and a second transistor of complementary types (NPN-PNP). The emitter of said first transistor constitutes the main electrode 1 of the device and the emitter of said second transistor constitutes the main electrode *d* of the device. Further the base of the first transistor is connected to the collector of the second and the base of the second is connected to the collector of the first. The first base-collector connection is connected to the control input s of the device by a diode. Examplified as in FIG. 8 the first transistor is of PNP-type and the other of NPN-type with the diode being connected by means of its cathode to the control input *s*. When a positive voltage is connected between the main electrodes 1 and *d* and a low voltage, for instance ground, is connected to the control input s said first transistor will be conducting as a result of the positive voltage across the emitter-base junction of the transistor. Hence, the potential of the collector of the first transistor will increase as does the base of the first transistor which causes the second transistor to go conducting. When the second transistor is conducting current the emitter potential of this transistor will be transferred to its collector which is connected to the base of the first transistor. This base potential will now hold the first transistor in its conducting state when the control signal drops and the contact device has taken its stable conducting state.

The base-collector connection is via a resistor connected to a positive voltage source and via an addition diode counter-connected with respect to the earlier mentioned diode and furthermore connected via a diode to an output *e* and directly to an output *n* respectively on the contact device E. According to the above, the potential at the base-collector connection is unambiguously dependent on the state of the contact device, conducting and non-conducting respectively. In the conducting state the potential is low and in the nonconducting state high. The signals at the outputs e and n are utilized for controlling through-connection circuits in the embodiments of the control and holding circuits. For control and holding circuits with individual through connection according to the above the output *n* is used without a diode and for a common through connection circuit the output *e* is used with a diode. The diode in the latter case gives the desired OR-function. It is sufficient that one of the contact devices in a column is in its conducting state in order to require the through connection of control and holding voltages to the subsequent matrix stage.

FIG. 9 shows the device according to FIG. 8 completed with two resistors in order to adapt the device to given function parameters. In this embodiment the holding current of the contact device may be actuated through the choise of resistor values and the gain of the transistors.

Figure 10:
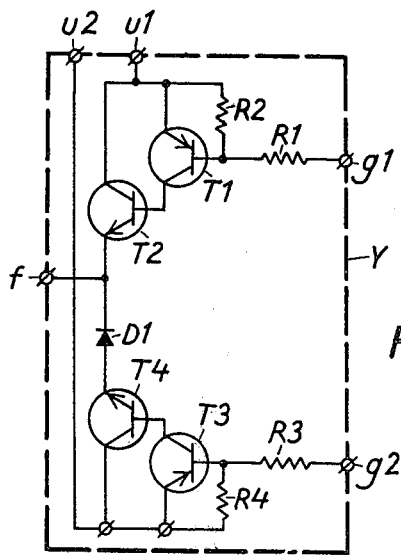
FIG. 10 shows an embodiment of the through connection circuit according to FIG. 5.

FIG. 10 shows an embodiment of the through connection circuit according to FIG. 5. Each of two identically designed electronic contact devices are arranged to connect one voltage from an associated voltage feeding terminal $u1$ and $u2$ respectively, to a common output $f$. A diode is provided in the connection to the output $f$ for the holding voltage in order to present at the output $f$ the most positive of the connected voltages.

Each contact device comprises a first and a second transistor besides a first and a second resistor. The function is the same for both contact devices and only one will be further described.

For low potential at the detection input $g2$ the positive voltage UH connected to the voltage feeding terminal $u2$ will cause a current to flow through the resistors R4 and R3. The positive voltage across the emitter-base region of the transistor T3 causes this transistor to conduct. Thus, the base potential of the transistor T4 is increased and this transistor will in its turn be able to conduct a current if a complete collector circuit is provided via the output $f$. The voltage at the anode of the diode D1 will about equal the holding voltage UH. The connection of the control voltage UM, which is more positive then the voltage UH, to the input $f$ via the voltage feeding terminal $u1$ is controlled in an analogous way by the potential at the detection input $g1$. The diode D1 is consequently reversed biased if the voltage UM is connected to the output f which in other words means that the highest of the voltages at the emitters of the transistors T2 and T4 is connected to the output $f$.

All the embodiments of the invention described here above comprise contact devices E of semi-conducting type which are controlled by means of electric voltages at the control inputs $s$. The idea of the invention comprises however also embodiments in which the contact devices E are controlled by means of other signals, for instance optical. Such an embodiment is for instance the one which has contact devices designed as a combination of a light emitting diode and a light activated thyristor.

We claim:

1. A matrix switch comprising a matrix of relays arrayed in groups, each of said relays having signal transfer contact means and an energizing means with first and second terminals, a plurality of first signal transfer terminal means, each of said first signal transfer terminal means being connected in parallel to the signal transfer contact means of one of the relays in each of said groups of relays, a plurality of second signal transfer terminal means, each of said second signal transfer terminal means being connected in parallel to the signal transfer contacts of fall of the relays in a different group of said groups of relays, a plurality of first control current terminals, each of said first control current terminals being connected in parallel to the first terminal of the energizing means of one of the relays in each of said groups of relays, a plurality of second control current terminals, a plurality of control and holding circuits each associated with a different one of said groups of relays, each of said control and holding circuits having a control signal input for receiving a marking signal, and first and second control current transfer means, each of said control and holding circuits having switching means connecting said first and second control current transfer means and rendered conductive when a marking signal is received at its control signal input and at least a given current is available for flowing from one to the other of its control current transfer means and is rendered non-conductive thereafter when the available current is less than said given current, means for connecting first control current transfer means of each of said control and holding circuits in parallel to the second terminals of the energizing means for each relay in the associated group, means connecting the second control current transfer means of each of said control and holding circuits to a different one of said second control current terminals, means for selectively applying marking signals to the control signal inputs of said control and holding circuits, and means for selectively applying sources of current with a controllable amplitude across said first and second control current terminals.

2. The apparatus of claim 1 wherein each of said switching means of each of said control and holding circuits comprises: a plurality of switching devices each associated with a different one of the relays of the group of relays controlled by the control and holding circuit, each of said switching devices having a control signal electrode connected to the associated control signal input and first and second current transfer electrodes, means for connecting one of said current transfer electrodes to the second terminal of the energizing means of one of the relays in the associated group, and means for connecting the other of said current transfer electrodes to the associated second control current transfer means.

3. The apparatus of claim 1 wherein each of said switching means of each of said control and holding circuits comprises: a plurality of switching devices each associated with a different one of the relays of the group of relays controlled by the control and holding circuit, each of said switching devices comprising first and second switch means, said first switch means having first and second current transfer electrodes and a control electrode for controlling the conductivity of said first switch means in accordance with the amplitude of the signal present at said control electrode, said second switch means having first and second current transfer electrodes, a control electrode and a conductive-state indicating electrode, means for connecting said conductive-state indicating electrode to the control electrode of said first switch means so that when said second switch means is in a conductive state said first switch means is switched to a conductive state, means for connecting one of the current transfer electrodes of said first switch means to the associated second signal transfer means, means for connecting the other of the current transfer electrodes of said first switch means to the first current control terminal connected to first terminal of the energizing means of the associated relay, means for connecting one of the current transfer electrodes of said second switch means to the associated first control current transfer means, means for connecting the other current transfer electrode of said second switch means to a source of operating potential, and means for connecting the control electrode of said second switch means to the associated control signal input for receiving a marking signal.

4. The apparatus of claim 1 wherein each of said switching means of each of said control and holding circuits comprises: a plurality of switching devices each associated with a different one of the relays of the group of relays controlled by the control and holding circuit, switching devices having a control signal electrode, first and second current transfer electrodes and a conductive-state indicating electrode, means for connecting said control signal electrode to the associated control signal input, means for connecting one of said current transfer electrodes to the second terminal of the energizing means of one of the relays in the associated group, means for connecting the other of said current transfer electrodes to a source of operating potential; and a common connection circuit having a timing input means for receiving a periodically recurring timing signal, a marking voltage input means connected to the associated control signal input for receiving the marking signal, a holding voltage input means for receiving a holding voltage; a common connection output means connected to the associated second control current terminal, and an input connected in common to the conductive-state indicating electrodes of all of the switching devices of the plurality, and switch means responsive to particular signal levels on any one of the conductive-state indicating electrodes and a signal at said timing input means for connecting either of said marking voltage input means or said holding voltage input means to said common connection output means.

5. The apparatus of claim 1 wherein each of said switching means of each of said control and holding circuits comprises: a plurality of switching devices each associated with a different one of the relays of the groups of relays controlled by the control and holding circuit, switching devices having a control signal electrode, first and second current transfer electrodes and a conductive-state indicating electrode, means for connecting said control signal electrode to the associated control signal input, means for connecting one of said current transfer electrodes to the second terminal of the energizing means of one of the relays in the associated group; a plurality of current measuring means each associated with one of said switching devices and each hahving a first terminal connected to the other current transfer electrode of the associated switching device, a second terminal connected to a source of operating potential, and current indicating terminal for transmitting a signal indicating the flow of current between the first and second terminals; and a common connection circuit having a marking voltage input means connected to the associated control signal input for receiving the marking signal, a holding voltage input means for receiving a holding voltage, a common connection output means connected to the associated second control current terminal, a first common connection input means connected in common with all the conductive-state indicating electrodes of the switching devices, a second common connection input means connected in common with all the current indicating terminals of the current measuring means, and means responsive to a first combination of signals at the common connection input means for connecting the marking voltage input means to said common connection output means, and responsive to a second combination of signals at the common connection input means for connecting the holding voltage input means to said common connection output means.

6. The apparatus of claim 1 wherein each of said switching means of each of said control and holding circuits comprises: a plurality of switching devices each associated with a different one of the relays of the groups of relays controlled by the control and holding circuit, each of said switching devices comprising first and second switch means, said first switch means having first and second current transfer electrodes and a control electrode for controlling the conductivity of said first switch means in accordance with the amplitude of the signal present at said control electrode, said second switch means having first and second current transfer electrodes and a control electrode, means for connecting the control electrode of said first switch means to the associated control signal input, means for connecting one of the current transfer electrodes of said first switch means to a source of operating potential, means for connecting the other of the current transfer electrodes of said first switch means to the control electrode of said second switch means, means for connecting one of the current transfer electrodes of said second switch means to the associated second control current transfer means, and means for connecting the other current transfer electrode of said second switch means to the second terminal of the energizing means of the associated relay.

7. The apparatus of claim 2 wherein each of said switching devices comprises a first transistor and a complementary transistor, each of said transistors having base, emitter and collector terminals, means for connecting the collector terminal of one of said transistors to the base terminal of the other of said transistors, diode means for connecting the collector terminal of the other of said transistors and the base terminal of the one transistor to the associated control signal input, the emitter terminal of the one transistor being one of said current transfer electrodes, and the collector terminal of the other of said transistors being the other of said current transfer electrodes.

8. The apparatus of claim 3 wherein each of said second switch means comprises a first transistor and a complementary transistor, each of said transistors having base, emitter and collector terminals, means for connecting the collector terminal of one of said transistors to the base terminal of the other of said transistors, diode means for connecting the collector terminal of the other of said transistors and the base terminal of the one transistor to the associated control signal input, the emitter terminal of the one transistor being one of the current transfer electrodes and the collector terminal of the other of said transistors being the other of the current transfer electrodes of the second switch means.

9. The apparatus of claim 6 wherein each of said first switch means comprises a first transistor and a complementary transistor, each of said transistors having base, emitter and collector terminals, means for connecting the collector terminal of one of said transistors to the base terminal of the other of said transistors, diode means for connecting the collector terminal of the other of said transistors and the base terminal of the one transistor to the associated control signal input, one of the current transfer electrodes and the collector terminal of the other of said transistors being the other of the current transfer electrodes of the first switch means.

10. The apparatus of claim 5 wherein said common connection circuit comprises: first and second electronic contact devices, each of said contact devices comprising a first transistor and a complementary transistor each having emitter, collector and base terminals, a first resistor interconnecting the emitter and base terminals of the first transistor, means for interconnecting the collector terminal of the first transistor to the base terminal of the complementary transistor, means for interconnecting the emitter terminal of the first transistor and the collector terminal of the complementary transistor, means for connecting the emitter terminals of the complementary transistor of said first electronic contact device to said common connection output, diode means for connecting the emitter terminal of the complementary transistor of said second electronic contact device to said common connection output means, means for connecting the interconnected collector and the emitter terminals of the transistors of said pg,25 first and second electronic contact devices to said marking voltage input means and holding voltage input means, respectively, and first resistor means for connecting the base terminals of the first transistor of said first and second electronic contact devices to said first and second common connection input, respectively.

11. The apparatus of claim 7 further comprising further means connected to the base terminal of the one transistor for indicating the conductive state of the transistors.

* * * * *